UNITED STATES PATENT OFFICE.

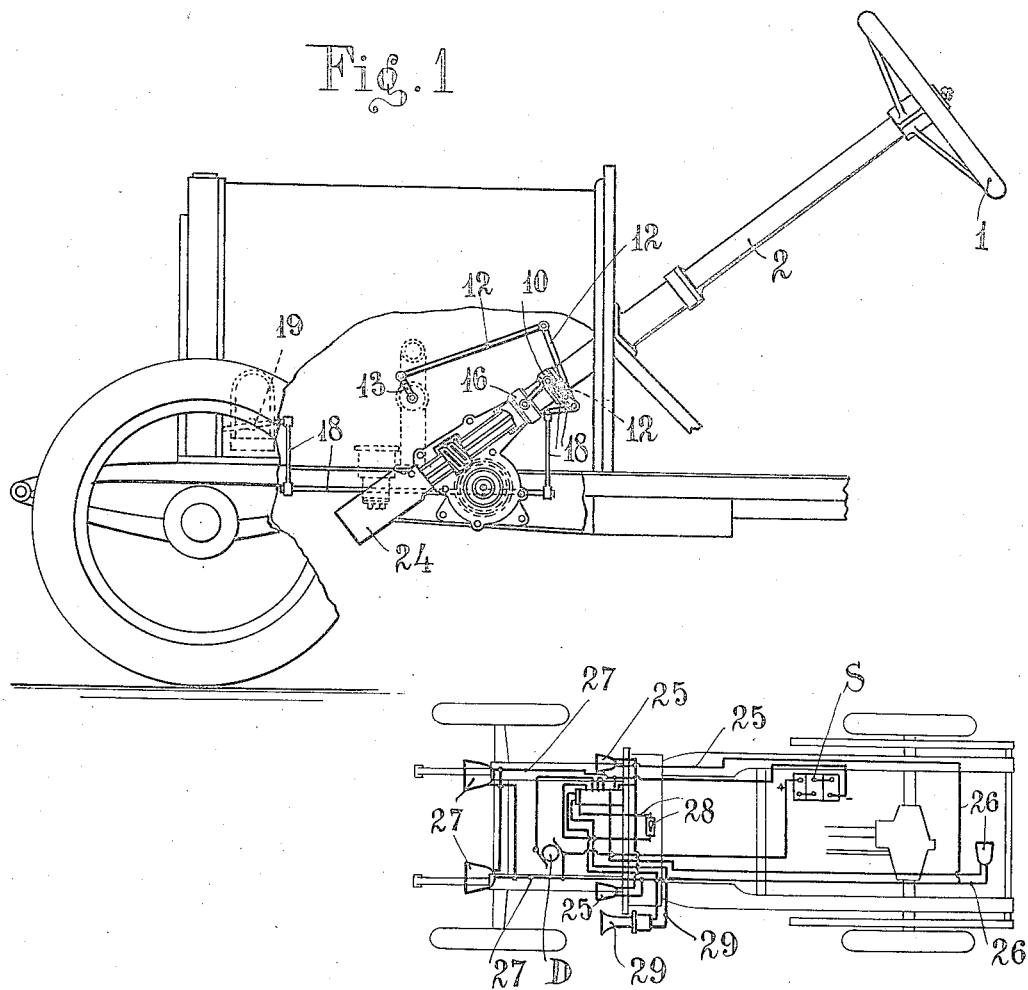
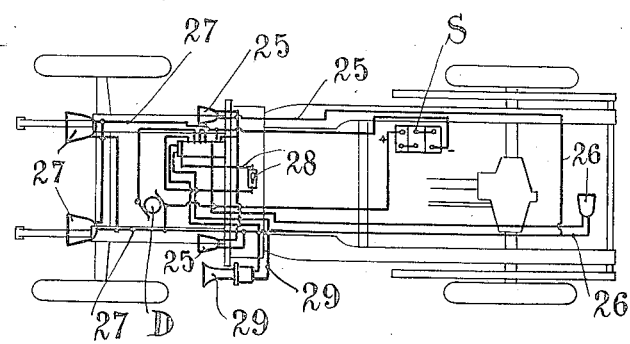
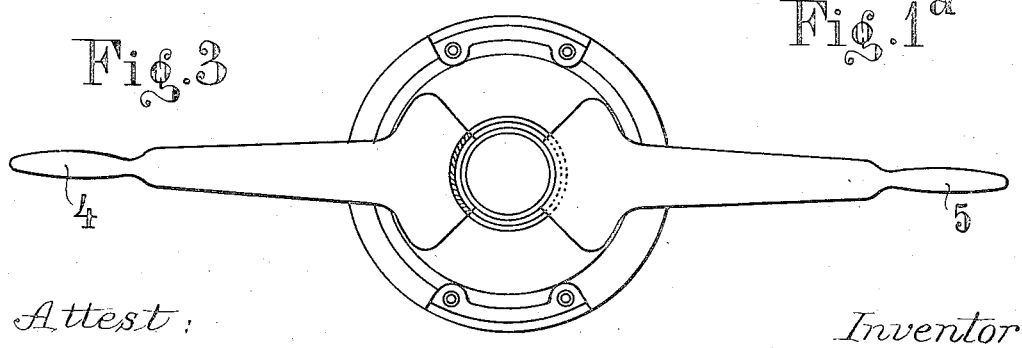

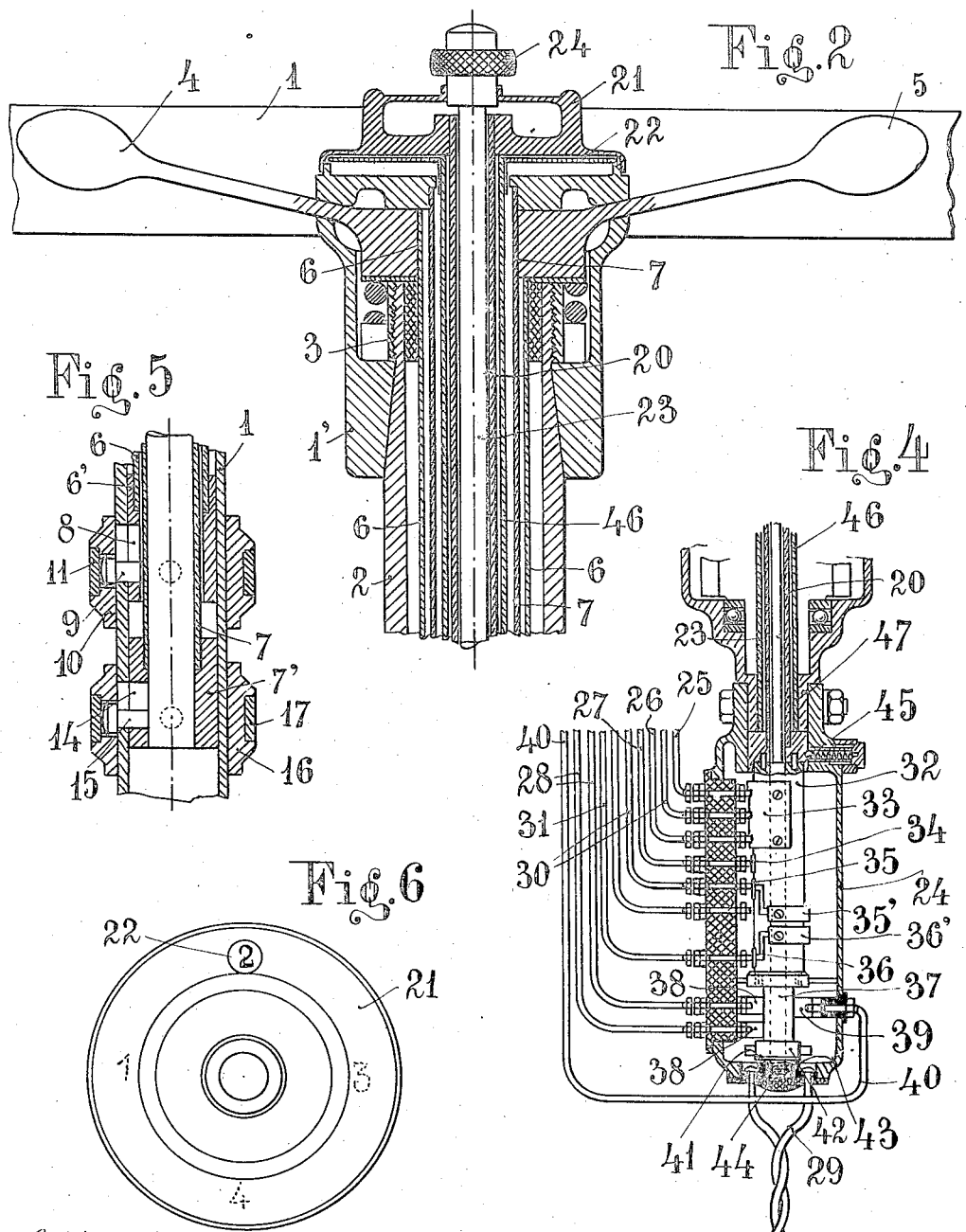

VINCENZO LANCIA, OF TURIN, ITALY.

CONTROLLING DEVICE FOR USE IN AUTOMOBILES.

1,138,577.  Specification of Letters Patent.  Patented May 4, 1915.

Application filed July 31, 1913. Serial No. 782,302.

*To all whom it may concern:*

Be it known that I, VINCENZO LANCIA, a subject of the King of Italy, residing in Turin, Italy, have invented certain new and useful Improvements in Controlling Devices for Use in Automobiles, of which the following is a specification.

This invention relates to an arrangement applicable to motor cars provided with an electric generator for lighting and other purposes, enabling the driver to control the circuits of various electrically driven apparatus as well as to perform other operations without taking off his hands from the wheel.

It is known that at present on cars provided with a dynamo for lighting, the switches are arranged on a board which is not quite within reach of the driver who is therefore generally obliged to move and to slacken or stop driving, in order to be able to operate them.

According to this invention, the disadvantage in question is obviated by grouping on the steering wheel all the control parts, not only for the carbureter cock and for advancing ignition, which is well known, but also those intended to light the lamps and head lights, to cut off the ignition current from the magneto (for stopping the engine) and to operate the hooter, without it being necessary to bring the wires to the steering wheel, the said wires stopping on the contrary at contacts arranged at the base of the steering column.

To that end, in the interior of the steering column are arranged several concentric tubes, the upper ends of which are operated by means of handles or the like, grouped on the steering wheel, while their lower ends are connected to the parts to be controlled, and as regards the control of electric circuits, to a contact device mounted directly on the casing of the steering gear.

The accompanying drawing shows, by way of example, a construction according to this invention.

Figure 1 is a side elevation of the steering gear and Fig. 1ᴬ is a plan of the frame with electric circuits. Fig. 2 a longitudinal section of the upper end of the steering gear. Fig. 3 is a plan of the central portion of the steering wheel, Fig. 4 a detail of the electric contacts mounted at the lower end of the steering gear, Fig. 5 shows in detail the method of fitting the inner tubes and Fig. 6 is an outside view of the handle for operating a portion of the electric contact device.

As will be seen from Figs. 1–3, the hub 1' of the steering wheel 1, secured on the column 2 by means of the nut 3, carries two independent levers 4 and 5, the former of which, secured to the tube 6, is used for instance for operating the carbureter cock, while the lever 5 secured to the tube 7, is used for advancing ignition. The rotation of the levers 4 and 5 can be transmitted to the parts to be operated, by means of helical slots, as shown in Fig. 5 in which the tube 6 is provided at the bottom end with a thickened portion 6' in which is made a slot 8 with which engages the roller 9 pivoted in the collar 10 longitudinally adjustable on the column 2 and carrying a ring 11 connected by levers 12 to the part to be controlled (Fig. 1), that is to say, to the lever 13 of the carbureter cock. In an analogous manner, the tube 7 arranged in the interior of the tube 6 and secured to the lever 5, is provided with a thickened portion 7' with a helical slot 14, with which engages a roller 15 pivoted in the collar 16, the ring 17 of which is connected by means of levers 18 (Fig. 1) to the magneto 19. In the interior of the tube 7 is mounted another tube 20 secured at its upper end to a handle 21 which, as shown in Fig. 6, may be provided with openings intended to uncover signs or figures marked on a stationary surface 22 enabling the position of the handle itself to be ascertained. Finally, in the interior of the tube 20 is further mounted, in a loosely rotatable and longitudinally adjustable manner, a rod 23 provided at the upper end with a button 24. At their lower ends, the tube 20 and the rod 23 (Figs. 1 and 4) are connected to two independent elements of an electric contact device 24 mounted on the steering gear casing and capable of closing the various circuits by the movement of its parts when they are operated.

In the construction shown in Fig. 1ᴬ of the drawing, assuming that there are in the circuit supplied by a dynamo D and a storage battery S, two lamps (circuit 25), a back light (circuit 26), two head lights (circuit 27), a lamp placed on the dash board of the car for the control apparatus (pressure gages, ammeters, etc.,) (circuit 28), and an electric syren or the like (circuit 29), while the wires 30 and 31 lead respectively to the storage battery and to the dynamo, there will be for the fixed contacts of the contact device, the arrangement shown in Fig. 4, while the drum 32 of insulating material, secured to the tube 20, carries the contacts 33, 34, 35, 35′, 36 and 36′ arranged on the cylindrical surface of the drum in such a manner that, by rotating the latter, it is possible to bring about in the known manner all the desired combinations, that is to say, the whole extinguished; head lights and rear light lighted, lamps and rear light lighted and the head lights, lamps and rear light lighted. The drum 37 secured to the central rod 23 and electrically connected to the body is provided with a segment of conducting material enabling the brushes 38 to be connected together, and in that way, the circuit 28 closed for lighting the lamp arranged on the dash board, or contact with the brush 39 which by means of the wire 40 communicates with the magneto switch, to be established, so that in this position the ignition is cut off. By means of the said drum 37 it is therefore possible to bring about the following combinations: engine running and the dash board lamp extinguished, when there is no contact either with the brushes 38 or with the brushes 39; lamp lighted when the brushes 38 are in contact, and the engine stopped and the lamp extinguished, when contact is established with the brush 39. The drum 37 is further provided at the lower end with a ring 41 of conducting material mounted on an insulating part 42. This ring 41 can be brought into contact with the ends 43 of the wires 29 leading to the hooter. A spring 44 normally keeps the drum 37 away from the contacts 43, so that the circuit of the hooter is closed by pushing the button 24 of the rod 23. It is advisable to provide these rotary drums of the contact device with stops, such as that shown at 45 in Fig. 4, in order to prevent vibrations of the car from altering the position of the contact device. It is also advantageous that the parts controlling the electric circuits, should remain independent of the rotation that the steering tube must be given with the tubes 6 and 7. To that end, between the tube 20 and the tube 7 is arranged another tube 46 soldered at 47 to the steering gear casing (Fig. 4) and the fixed disk 22 can be mounted on the said tube 46 below the handle 21.

The construction described therefore enables the driver to operate the levers 4 and 5 without taking off his hands from the wheel, and to light or put out the head lights, lamps, etc., by operating the handle 21, to light another lamp or to cut off ignition by turning the button 24 and to operate the hooter by pushing the said button, without the contacts having to be brought to the steering wheel, which would require a different and delicate laying of several wires.

What I claim as my invention and desire to secure by Letters Patent is:—

1. In a construction for controlling circuits installed on a motor car a current generator, apparatus switched into the circuits of the generator, other circuits, a contact device at which terminate the wires of the said various circuits, independent drums for the control of the contact device, a steering wheel, operating parts mounted on the steering wheel, and means for connecting the said parts to the drums of the contact device.

2. In a construction for the control of circuits installed on a motor car a current generator, a steering tube, contacts grouped into a contact device mounted at the base of the steering tube, independent drums coöperating with the contact device, a tube mounted inside the steering tube and connected to one of the drums of the contact device, a rod mounted inside the preceding tube and connected to the other drum of the contact device, a steering wheel and parts on the steering wheel for operating the said tube and the said rod.

3. In a construction for the control of the circuits installed on a motor car provided with a current generator, a steering tube, contacts grouped into a contact device mounted at the base of the said steering tube, a rotatable drum for the control of contacts of the said device, said drum being longitudinally movable for controlling a front contact, a member mounted in the interior of the steering tube and connected to the said drum, and means on the hand wheel for operating said member.

4. In a construction for the control of the circuits installed on a motor car a current generator, a steering tube, contacts grouped into a contact device mounted at the base of the said steering tube, drums coöperating with the contact device, one of the said drums being longitudinally movable for controlling a front contact and connected to a central rod, a button on the hand wheel for operating the said drum, a tube concentric with the said rod, mounted in the interior of the said steering tube and connected to the other drum of the combinator, a steering wheel and a handle on the steering wheel connected to the said tube.

5. In a construction for the control of circuits installed on a motor car a current generator, a steering tube, contacts mounted at the base of the said tube, drums coöperating with the said contacts, a steering wheel, operating parts on the steering wheel, concentric tubes connecting the operating parts to the control drums, and a tube inclosing the said tubes and mounted in a stationary manner in the interior of the steering tube.

In testimony whereof I have signed my name to this specification in the presence of two subscribing witnesses.

VINCENZO LANCIA.

Witnesses:
  CARLO TORBAY,
  C. L. TEJLES.